(12) United States Patent
Hagiwara et al.

(10) Patent No.: US 8,802,268 B2
(45) Date of Patent: Aug. 12, 2014

(54) ELECTROCHEMICAL DEVICE AND MANUFACTURING METHOD THEREOF

(75) Inventors: Naoto Hagiwara, Takasaki (JP); Katsuei Ishida, Takasaki (JP); Kazushi Yawata, Tsukuba (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 276 days.

(21) Appl. No.: 13/203,663

(22) PCT Filed: Mar. 16, 2010

(86) PCT No.: PCT/JP2010/054385
§ 371 (c)(1),
(2), (4) Date: Aug. 26, 2011

(87) PCT Pub. No.: WO2010/125867
PCT Pub. Date: Nov. 4, 2010

(65) Prior Publication Data
US 2012/0040231 A1 Feb. 16, 2012

(30) Foreign Application Priority Data
Apr. 28, 2009 (JP) ................. 2009-108587

(51) Int. Cl.
| | | |
|---|---|---|
| *H01M 2/18* | (2006.01) | |
| *H01M 10/0585* | (2010.01) | |
| *H01M 10/0525* | (2010.01) | |
| *H01M 4/70* | (2006.01) | |
| *H01G 11/76* | (2013.01) | |
| *H01M 10/04* | (2006.01) | |
| *H01G 9/02* | (2006.01) | |
| *H01M 14/00* | (2006.01) | |
| *H01G 9/008* | (2006.01) | |
| *H01G 9/04* | (2006.01) | |
| *H01G 9/00* | (2006.01) | |
| *H01G 11/72* | (2013.01) | |
| *H01M 2/02* | (2006.01) | |
| *H01G 11/52* | (2013.01) | |
| *H01M 10/0583* | (2010.01) | |
| *H01G 11/12* | (2013.01) | |
| *H01G 11/70* | (2013.01) | |
| *H01G 11/86* | (2013.01) | |
| *H01G 11/80* | (2013.01) | |

(52) U.S. Cl.
CPC .......... *H01G 9/016* (2013.01); *H01M 10/0525* (2013.01); *H01M 4/70* (2013.01); *Y02E 60/13* (2013.01); *H01G 11/76* (2013.01); *H01M 10/0459* (2013.01); *H01G 9/02* (2013.01); *H01M 14/00* (2013.01); *H01G 9/058* (2013.01); *H01G 9/155* (2013.01); *H01G 11/72* (2013.01); *H01M 2/021* (2013.01); *H01G 11/52* (2013.01); *H01M 10/0583* (2013.01); *H01G 11/12* (2013.01); *H01M 10/045* (2013.01); *H01G 11/70* (2013.01); *H01G 11/80* (2013.01); *H01M 2/18* (2013.01); *Y02E 60/122* (2013.01); *H01G 11/86* (2013.01)
USPC ........... 429/136; 429/122; 429/130; 361/523; 361/502

(58) Field of Classification Search
None
See application file for complete search history.

(56) References Cited

U.S. PATENT DOCUMENTS

| | | |
|---|---|---|
| 2001/0028546 A1 | 10/2001 | Kasahara et al. |
| 2007/0029368 A1 | 2/2007 | Kubouchi et al. |
| 2009/0029260 A1 | 1/2009 | Hagiwara et al. |
| 2009/0310281 A1 | 12/2009 | Hirose et al. |

FOREIGN PATENT DOCUMENTS

| | | | | |
|---|---|---|---|---|
| JP | 06-176979 | * | 6/1994 | ............... H01G 9/05 |
| JP | H06-176979 A | | 6/1994 | |
| JP | 09-007893 | * | 1/1997 | ............ H01G 9/016 |
| JP | H09-007893 A | | 1/1997 | |
| JP | 2001-250742 A | | 9/2001 | |
| JP | 2002-124435 A | | 4/2002 | |
| JP | 2002-157997 A | | 5/2002 | |
| JP | 2008-186943 A | | 8/2008 | |

| | | | |
|---|---|---|---|
| JP | 2009-032727 A | 2/2009 | |
| WO | 2004/084244 A | 9/2004 | |
| WO | 2007/063742 A | 6/2007 | |

* cited by examiner

*Primary Examiner* — Barbara Gilliam
*Assistant Examiner* — Angela Martin
(74) *Attorney, Agent, or Firm* — Law Office of Katsuhiro Arai

(57) ABSTRACT

Provide an electrochemical device offering a large capacity per current collector and a low internal resistance, which is also easy to assemble. Provided is a laminated sheet body 16S by inserting a negative-electrode continuous body 11BW between an adjacent pair of first current collectors 12a, 12a with their first current collector main units 12a1 connected together, and also between an adjacent pair of first current collectors 12a, 12a with their first tabs 12a2 connected together, with respect to a plurality of positive electrodes 11A arranged in the width direction apart from each other, after which the negative-electrode continuous body of the laminated sheet body is cut to the unit width dimension of an element to obtain a plurality of laminated bodies 16.

5 Claims, 9 Drawing Sheets

ELECTROCHEMICAL DEVICE AND MANUFACTURING METHOD THEREOF

This application is the U.S. National Phase under 35 U.S.C. §371 of International Application PCT/JP2010/054385, filed Mar. 16, 2010, which claims priority to Japanese Patent Application No. 2009-108587, filed Apr. 28, 2009. The International Application was published under PCT Article 21(2) in a language other than English.

TECHNICAL FIELD

The present invention relates to an electrochemical device having a laminated element constituted by positive and negative electrodes that are layered alternately on top of each other with a separator in between.

BACKGROUND ART

In recent years, compact but large-capacity electrochemical devices that can be used for mobile phones, notebook personal computers and other portable electronics devices are drawing attention. Known examples of these electrochemical devices include, among others, electrical double-layer capacitors and lithium-ion capacitors.

Among others, Japanese Patent Laid-open No. Hei 6-176979 (Patent Literature 1) proposes one example of such an electrochemical device, or specifically a solid electrolytic capacitor that offers a larger capacity without losing such features as compactness and light weight. As shown in FIG. 7, a capacitor element 120 described in Patent Literature 1 has: an anode body 102 constituted by small unit areas dividing the entire anode body into multiple sections and on which an oxide film layer 104 and solid electrolytic layer 106 are formed; and a wire conductor 110 which is flexible and constituted by a conductor 112 whose surface is covered with an insulation layer 114, wherein the conductor 112 is exposed in an area overlapping with the solid electrolytic layer 106. This capacitor element 120 has the wire conductor 110 sandwiched between the solid electrolytic layers 106 formed by folding the anode body 102, and is structured in such a way that the exposed conductor 112 and solid electrolytic layer 106 are electrically connected via a conducting body 118. This capacitor element 120 has a high internal resistance because one end of the folded wire conductor is used as a lead terminal.

Japanese Patent Laid-open No. Hei 9-7893 (Patent Literature 2) proposes an electrical double-layer capacitor having a large capacitance and low internal resistance. As shown in FIG. 8, this electrical double-layer capacitor has an element constituted by: a pair of current collectors constituted by two strip-shaped conductors 219a, 219b that are folded alternately, polarizable electrodes 212 formed on the laminated surfaces of the current collectors, and a separator 203 provided between the adjacent polarizable electrodes 212. The electric double-layer capacitor thus structured needs a lamination process for each element, which is not suitable for mass production.

Japanese Patent Laid-open No. 2002-157997 (Patent Literature 3) proposes a folded lithium-ion battery that can be manufactured in a simple process, and method of manufacturing the same. Under this manufacturing method described in Patent Literature 3, as shown in FIG. 9 a negative-electrode sheet 301 is created by applying an active material 304 on strip-shaped uncoated areas 307 provided on both sides of a long negative-electrode current collector. On both sides of this sheet, separators 309 are laminated via adhesive and then reed-shaped positive-electrode sheets 302 each having a strip-shaped area 308 uncoated with the active material and made wider than the strip-shaped uncoated area 307 on the negative electrode are laminated via adhesive. Also, the end of the negative electrode coated with the active material is positioned and laminated in such a way that it projects to the area of the positive electrode uncoated with the active material. Next, an area 313 between the adjacent positive-electrode sheets 302 is cut off and negative and positive electrode terminals are installed, after which they are folded at the strip-shaped uncoated areas 307, 308 to create a folded lithium battery. According to this manufacturing method in Patent Literature 3, the obtained battery has a small capacity per current collector and must have many laminated layers to obtain a large capacity, and consequently reducing the thickness becomes difficult. Also, this battery has a high internal resistance.

PRIOR ART LITERATURES

Patent Literatures

Patent Literature 1: Japanese Patent Laid-open No. Hei 6-176979
Patent Literature 2: Japanese Patent Laid-open No. Hei 9-7893
Patent Literature 3: Japanese Patent Laid-open No. 2002-157997

SUMMARY OF THE INVENTION

Problems to be Solved by the Invention

None of the conventional electrochemical devices mentioned above can simultaneously meet the three requirements of (1) large capacity per current collector, (2) low internal resistance, and (3) easy to assemble. It is one object of the present invention to provide an electrochemical device that has a large capacity per current collector, low internal resistance and is easy to assemble. It is another object of the present invention to provide a manufacturing method that allows the aforementioned electrochemical device to be produced efficiently in a stable manner.

Means for Solving the Problems

In an embodiment of the present invention aimed to achieve the aforementioned object, the electrochemical device has an element constituted by a laminated body which in turn comprises positive and negative electrodes layered on top of each other with a separator in between. The aforementioned positive electrode has: a plurality of first current collectors, each having a first current collector main unit which is a four-sided sheet of width dimension XA and length dimension YA, and also having a first tab projecting on one side of this first current collector main unit in the width direction and whose width dimension is smaller than the width dimension of the aforementioned first current collector main unit; and a first active material layer formed at least on one principal side of the aforementioned first current collector main unit; wherein the aforementioned plurality of first current collectors are such that the first current collector main units are connected together alternately in the length direction along the widthwise sides of these current collector main units and the first tabs are connected together alternately in the length direction along the widthwise sides of these tabs, while they are valley-folded along the widthwise side of the aforementioned first current collector main unit and mountain-folded along the widthwise side of the aforementioned tab, thereby causing the aforementioned first tabs to overlap with each other to achieve conductive connection. Also, the aforementioned negative electrode has: a plurality of second current collectors, each having a second current collector main unit which is a four-sided sheet of width dimension XB which is greater than width dimension XA of the aforementioned first current collector main unit and length dimension YB, and also having a second tab projecting on one side of this second current collector main unit in the width direction and whose width dimension is smaller than the width dimension of the aforementioned second current collector main unit; and a second active material layer formed on each of both principal sides of the aforementioned second current collector main unit; wherein the aforementioned second current collectors are positioned in such a way that the second tab is exposed between the adjacent pair of first current collectors with their first current collector main units connected together and also between the adjacent pair of first current collectors with the first tabs connected together, with the second tabs overlapping with each other to achieve conductive connection. Also, the aforementioned separator has width dimension XC which is the same as width dimension XB of the aforementioned second current collector main unit and length dimension YC which is at least twice as long as length dimension YB of the aforementioned second current collector main unit, where the separator is folded into two, roughly at the center of aforementioned length dimension YC, and positioned between the positive electrode and negative electrode in a manner enveloping the other side of the aforementioned negative-electrode current collector main unit in the width direction.

Also in an embodiment of the present invention, the electrochemical device can have an insulation layer covering a surface of the first tab of the aforementioned positive electrode on the proximal end side. Additionally in an embodiment of the present invention, the electrochemical device is structured with a separator between positive and negative electrodes, where the aforementioned positive electrode has: a first positive-electrode current collector, a second positive-electrode current collector, and a third positive-electrode current collector, each including a positive-electrode current collector main unit of rectangular sheet shape having an active material layer formed at least on one side, as well as a positive-electrode tab formed partly on one side of the applicable positive-electrode current collector main unit; wherein the aforementioned second positive-electrode current collector is electrically connected to the aforementioned first positive-electrode current collector via each positive-electrode tab and the positive-electrode current collector main unit thereof is positioned in a manner facing the back side of the positive-electrode current collector main unit of the aforementioned first positive-electrode current collector; and the aforementioned third positive-electrode current collector is electrically connected to the aforementioned first positive-electrode current collector via a side facing one side of each positive-electrode current collector main unit along which the positive-electrode tab is formed and the positive-electrode current collector main unit thereof is positioned in a manner facing the front side of the positive-electrode current collector main unit of the aforementioned first positive-electrode current collector;

the aforementioned negative electrode has: a first negative-electrode current collector, and a second negative-electrode current collector, each including a negative-electrode current collector main unit of rectangular sheet shape having an active material layer formed on both sides, as well as a negative-electrode tab formed partly on one side of the applicable negative-electrode current collector main unit; wherein the aforementioned first negative-electrode current collector is positioned between the aforementioned first positive-electrode current collector and second positive-electrode current collector; and the aforementioned second negative-electrode current collector is positioned between the aforementioned first positive-electrode current collector and third positive-electrode current collector and electrically connected to the aforementioned first negative-electrode current collector via each negative-electrode tab; and the aforementioned separator is constituted by: a first separator having a first sheet area covering the front side of the negative-electrode current collector main unit of the aforementioned first negative-electrode current collector, a second sheet area covering the back side, and a connection part connecting the first sheet area and second sheet area; and a second separator having a first sheet area covering the front side of the negative-electrode current collector main unit of the aforementioned second negative-electrode current collector, a second sheet area covering the back side, and a connection part connecting the first sheet area and second sheet area.

Also in an embodiment of the present invention, the method of manufacturing an electrochemical device includes: a step to prepare a positive-electrode sheet where a plurality of first current collectors, each having a first current collector main unit which is a four-sided sheet of width dimension XA and length dimension YA with a first active material layer formed on both principal sides, and also having a first tab projecting on one side of this first current collector main unit in the width direction and whose width dimension is smaller than the width dimension of the aforementioned first current collector main unit, are connected alternately in such a way that the first current collector main units and first tabs are connected together in an alternate manner, respectively, in the length direction; a step to valley-fold the positive-electrode sheet at the location where the first current collector main units are connected together and mountain-fold the sheet at the location where the first tabs are connected together, so as to obtain a positive electrode; a step to prepare a negative-electrode sheet where a plurality of second current collectors, each having a second current collector main unit which is a four-sided sheet of width dimension XB which is greater than the width dimension of the aforementioned first current collector main unit and length dimension YB with a second active material layer formed on both principal sides, and also having a second tab projecting on one side of this second current collector main unit in the width direction and whose width dimension is smaller than the width dimension of the aforementioned second current collector main units, are connected continuously in the width direction; a step to prepare a separator sheet where a plurality of separators, each having width dimension XC which is the same as width dimension XB of the aforementioned second current collector main unit and length dimension YC which is at least twice as long the length dimension of the aforementioned second current collector main unit, are connected continuously in the width direction; a step to obtain a negative-electrode continuous body by folding the separator sheet into two in the length direction with the negative-electrode sheet sandwiched in between; a step to obtain a laminated sheet body by inserting the negative-electrode continuous body between the adjacent pair of first current collectors with their first current collector main units connected together and also between the adjacent pair of first current collectors with the first tabs connected together, with respect to the plurality of positive electrodes arranged in the width direction apart from each other; a step to conductively connect the first positive-electrode tabs and second negative-electrode tabs of the laminated sheet body together; a step to cut the negative-electrode continuous body of the laminated sheet body to the unit width dimension of an element to obtain a plurality of laminated bodies each constituting an element; and a step to seal the laminated body in a package together with electrolyte solution.

Also in an embodiment of the present invention, the method of manufacturing an electrochemical device may be such that the aforementioned separator sheet and negative-electrode sheet are mutually adhered to each other in the step to obtain a negative-electrode continuous body.

Also in an embodiment of the present invention, the method of manufacturing an electrochemical device may be such that conductive connection of the tab and lead conductor is done at the same time as conductive connection of the tabs.

According to the electrochemical device in an embodiment of the present invention, each negative-electrode current collector is positioned in such a way that the second tab is exposed between the adjacent pairs of first current collectors with their first current collector main units connected together and also between the adjacent pair of first current collectors with the first tabs connected together, with respect to the positive electrodes that are folded, specifically valley-folded along the widthwise side of the first current collector main unit and mountain-folded along the widthwise side of the first tab, while at the same time a separator folded into two, roughly at the center of the length direction, is positioned between the positive electrode and negative electrode in a manner enveloping the negative current collector main unit. Accordingly, both principal sides of the plurality of laminated current collectors, except for the two outer sides of the laminated body, contribute to capacitance. For example, since the first current collector is connected via the widthwise side of the first current collector main unit, this connection position also contributes to capacitance. In this way, the capacity per current collector can be increased and a thin electrochemical device having a large capacity can be provided. Also, since the positive electrodes are folded by being valley-folded along the widthwise side of the first current collector main unit and mountain-folded along the widthwise side of the first tab, an increase in internal resistance can be suppressed even when the current collector surface is oxidized. Additionally, because width dimension XB of the second negative-electrode current collector main unit is larger than width dimension XA of the first positive-electrode current collector main unit, generation of gas arising from the non-facing part of the positive electrode can be suppressed.

Also according to the electrochemical device in an embodiment of the present invention, the insulation layer covering a surface of the first tab of the positive electrode on the proximal end side prevents generation of erroneous contact between the positive electrode and negative electrode.

According to the method of manufacturing an electrochemical device in an embodiment of the present invention, a positive-electrode sheet is prepared where a plurality of first current collectors, each having a first current collector main unit which is a four-sided sheet of width dimension XA and length dimension YA with a first active material layer formed on both principal sides, and also having a first tab projecting on one side of this first current collector main unit in the width direction and whose width dimension is smaller than the width dimension of the aforementioned first current collector main unit, are connected alternately in such a way that the first current collector main units and first tabs are connected together in an alternate manner, respectively, in the length direction, and then the positive-electrode sheet is valley-folded at the connection part of first current collector main units and mountain-folded at the connection part of first tabs, to obtain a positive electrode. Also, a negative-electrode sheet is prepared where a plurality of second current collectors, each having a second current collector main unit, which is a four-sided sheet of width dimension XB which is greater than the width dimension of the aforementioned first current collector main unit and length dimension YB with a second active material layer formed on both principal sides, and also having a second tab projecting on one side of this second current collector main unit in the width direction and whose width dimension is smaller than the width dimension of the aforementioned second current collector main unit, are connected continuously in the width direction. Also, a separator sheet is prepared where a plurality of separators, each having width dimension XC which is the same as width dimension XB of the aforementioned second current collector main unit and length dimension YC which is at least twice as long the length dimension of the aforementioned second current collector main unit, are connected continuously in the width direction. Next, a negative-electrode continuous body is obtained by folding the separator sheet into two in the length direction with the negative-electrode sheet sandwiched in between. Next, a laminated sheet body is obtained by inserting the negative-electrode continuous body between the adjacent pairs of first current collectors with their first current collector main units connected together and also between the adjacent pair of first current collectors with the first tabs connected together, with respect to the plurality of positive electrodes arranged in the width direction apart from each other. Next, the first positive-electrode tabs and second negative-electrode tabs of the laminated sheet body are conductively connected. Next, the negative-electrode continuous body of the laminated sheet body is cut to the unit width dimension of an element to obtain a plurality of laminated bodies each constituting an element. Next, the laminated body is sealed in a package together with electrolyte solution. This way, an electrochemical device having a large capacity per current collector can be produced efficiently in a stable manner.

According to the method of manufacturing an electrochemical device in an embodiment of the present invention, the aforementioned separator sheet and negative-electrode sheet are mutually adhered to each other in the aforementioned step to obtain a negative-electrode continuous body, which prevents positional shifting of the separator sheet and negative-electrode sheet on the negative-electrode continuous body or dropout of the negative-electrode sheet, thereby allowing for stable, efficient assembly.

According to the method of manufacturing an electrochemical device in an embodiment of the present invention, conductive connection of the aforementioned tab and lead conductor is done at the same time as conductive connection of the tabs, which reduces the assembly man-hours and shortens the lead time.

Effects of the Invention

According to the electrochemical device in an embodiment of the present invention, the capacity per current collector can be increased and therefore a thin electrochemical device having a large capacity can be provided. Also according to the method of manufacturing an electrochemical device in an embodiment of the present invention, an electrochemical device having a large capacity per current collector can be produced efficiently in a stable manner.

BRIEF DESCRIPTION OF THE DRAWINGS

FIG. 2(A) is a schematic section view of FIG. 1 above, along line A-A, while FIG. 2(B) is a schematic section view of FIG. 1 above, along line B-B.

FIG. 3(A) is a perspective view of the positive-electrode sheet, while FIG. 3(B) is an exploded perspective view of the positive electrode.

FIG. 4(A) is a perspective view of the negative-electrode sheet and separator sheet constituting the negative-electrode continuous body, while FIG. 4(B) is a perspective view of the negative-electrode continuous body.

MODE FOR CARRYING OUT THE INVENTION

Figure 1:
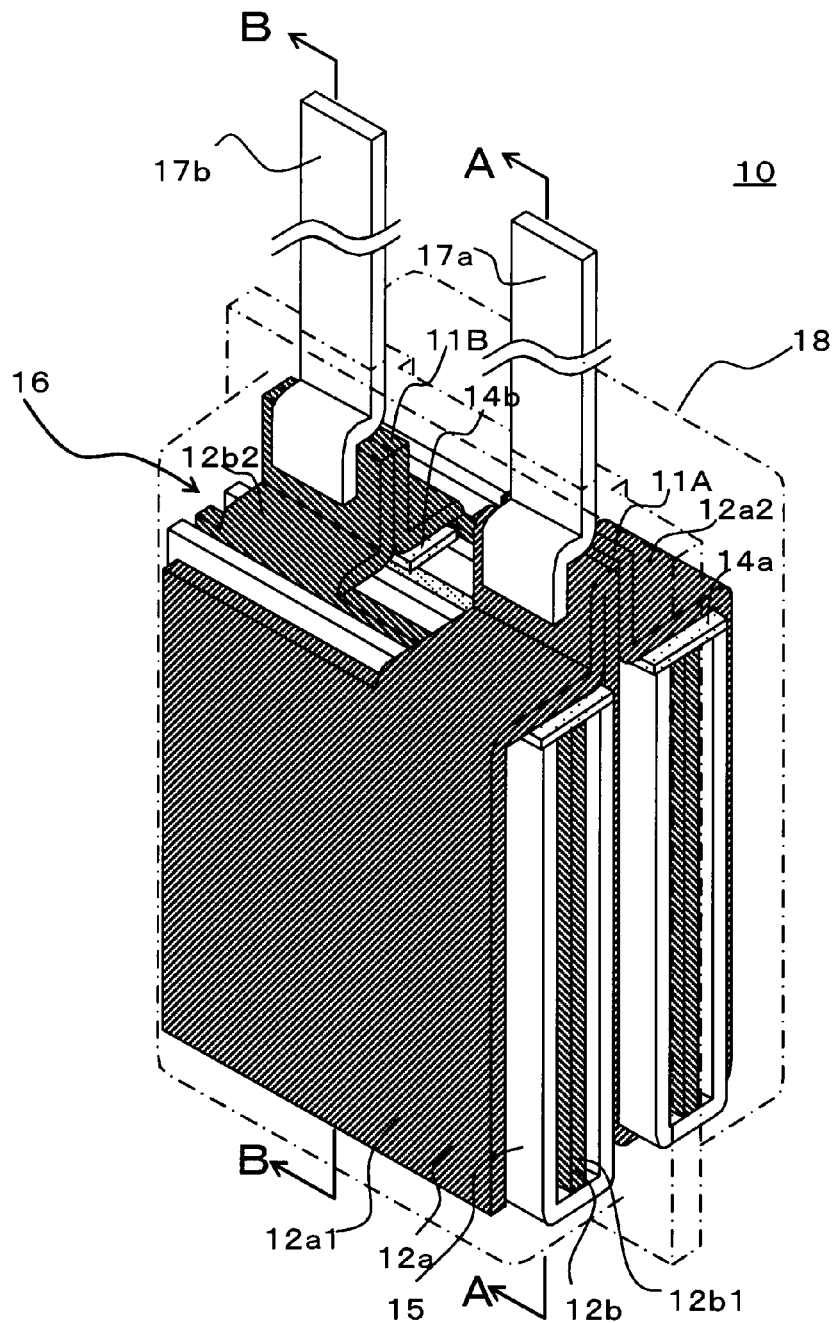
[FIG. 1] is a schematic drawing showing a perspective view of the inside of the package of the electrochemical device in an embodiment of the present invention.
Figure 2:
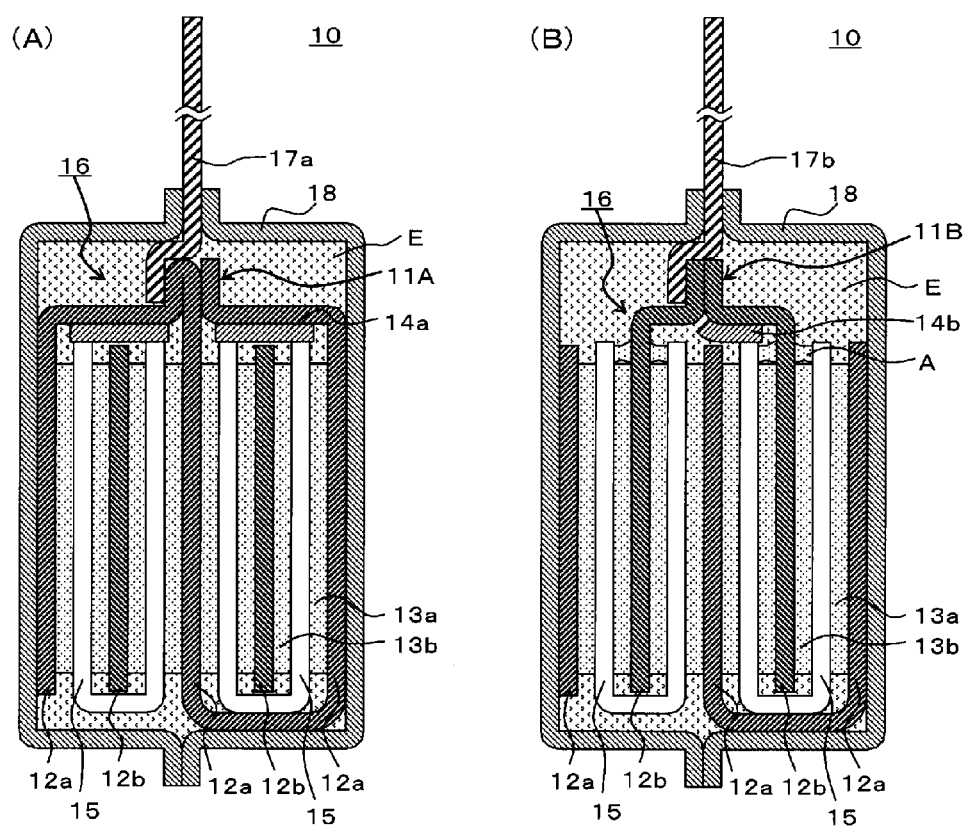
[FIG. 2] is a drawing showing an internal structure of the electrochemical device in an embodiment of the present invention, where
Figure 3:
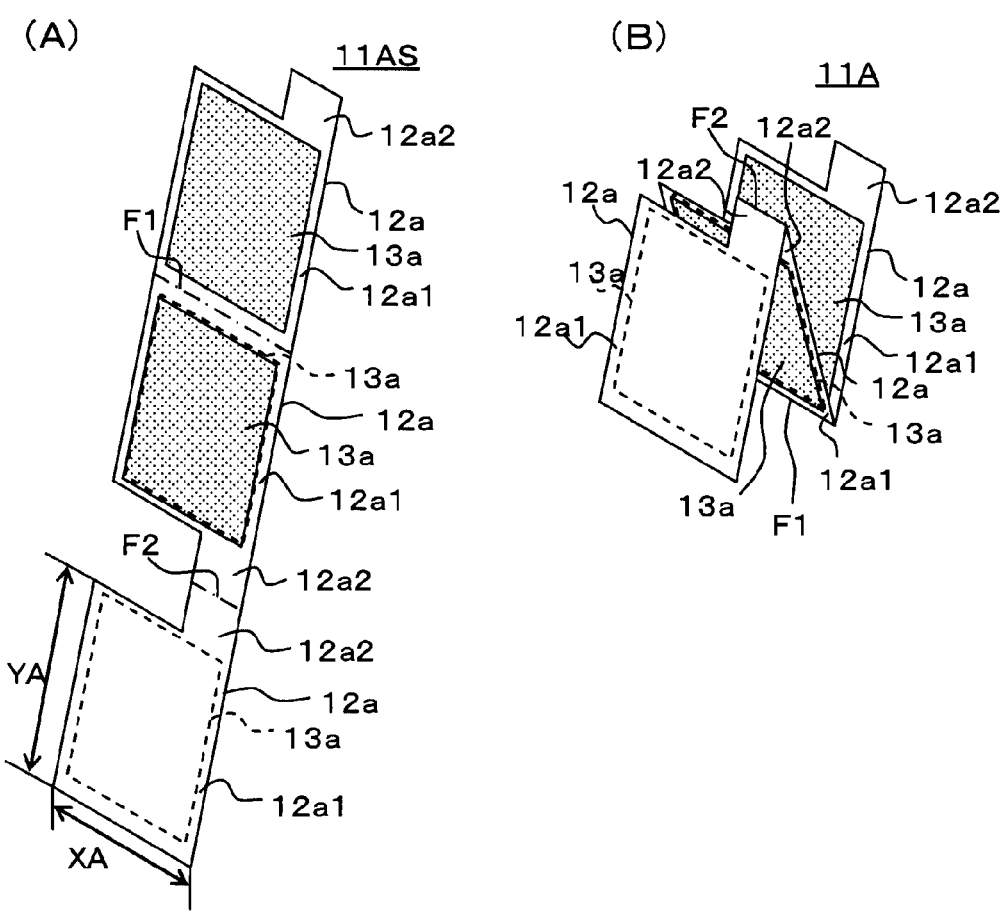
[FIG. 3] is a drawing showing the step to obtain a positive electrode under the method of manufacturing an electrochemical device in an embodiment of the present invention, where
Figure 4:
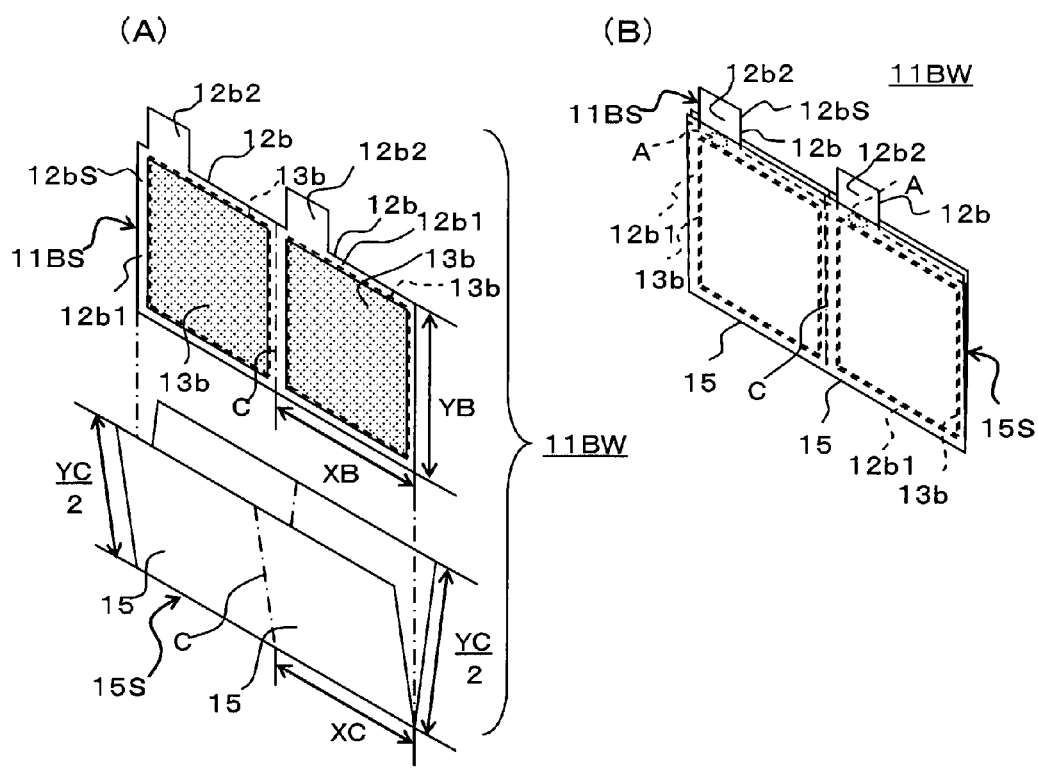
[FIG. 4] is a drawing showing the step to obtain a negative-electrode continuous body under the method of manufacturing an electrochemical device in an embodiment of the present invention, where

Various embodiments of an electrochemical device according to the present invention are explained below by referring to FIGS. 1 to 6.

In an embodiment, an electrochemical device 10 has an element constituted by a laminated body 16 which in turn comprises a positive electrode 11A and negative electrode 11B layered on top of each other via a separator 15. The positive electrode 11A has: a plurality of first current collectors 12a (the first current collector may be referred to as "positive-electrode current collector" in "Specification" herein and also in "What Is Claimed Is"), each having a first current collector main unit 12a1 which is a four-sided sheet of width dimension XA and length dimension YA (the first current collector main unit may be referred to as "positive-electrode current collector main unit" in this specification and also in the claims), and also having a first tab 12a2 projecting on one side of the first current collector main unit 12a1 in the width direction and whose width dimension is smaller than width dimension XA of the first current collector main unit 12a1 (the first tab may be referred to as "positive-electrode tab" in this specification and also in the claims); and a first active material layer 13a formed at least on one of the front and back principal sides of the first current collector main unit 12a1. The positive electrode 11A is structured by alternately connecting a plurality of (such as three) first current collectors 12a in the length direction. For example, the positive electrode 11A is structured by connecting the plurality of first current collectors 12a along the widthwise side F1 of the first current collector main unit 12a1 and then connecting the first tab 12a2 of one first current collector 12a thus connected, to the first tab 12a2 of other current collector 12a, along their widthwise side F2. The positive electrode 11A thus structured is, as shown in FIG. 3(B), folded by being valley-folded along the widthwise side F1 of the first current collector main unit 12a1 and mountain-folded along the widthwise side F2 of the tab 12a2, to conductively connect the pair of first tabs 12a2 facing each other. Also, the negative electrode 11B has: a plurality of second current collectors 12b (the second current collector may be referred to as "negative-electrode current collector" in this specification and also in the claims), each having a second current collector main unit 12b1 which is a four-sided sheet of width dimension XB which is greater than width dimension XA of the first current collector main unit 12a1 and length dimension YB (the second current collector main unit may be referred to as "negative-electrode current collector main unit" in this specification and also in the claims), and also having a second tab 12b2 projecting on one side of the second current collector main unit 12b1 in the width direction and whose width dimension is smaller than the width dimension of the second current collector main unit 12b1 (the second tab may be referred to as "negative-electrode tab" in this specification and also in the claims); and a second active material layer 13b formed on both principal sides of the second current collector main unit 12b1. One negative electrode 11B is inserted between the first current collectors 12a that are connected along the side F1, in a manner exposing the second tab 12b2, while the other negative electrode 11B is inserted between the first current collectors 12a that are connected along the side F2, in a manner exposing the second tab 12b2, and therefore the pair of facing second tabs 12b2 are conductively connected. The separator 15 is structured by folding into two, roughly at the center of length dimension YC, a rectangular member whose width dimension is the same as width dimension XB of the second current collector main unit 12b1 and length dimension is at least twice as long as length dimension YB of the second current collector main unit 12b1. This separator 15, having been folded into two, is positioned between the positive electrode 11A and negative electrode 11B in a manner enveloping the current collector main unit 12b1 of the negative electrode 11B. In other words, the separator 15 has a sheet-shaped member covering the front side of the current collector main unit 12b1 of the negative electrode 11B, a sheet-shaped member covering the back side, and a connection part connecting these sheet-shaped members.

Also, the electrochemical device 10 has an insulation layer 14a covering a surface of the first tab 12a2 of the positive electrode 11A on the proximal end side, and an insulation layer 14b covering a surface of the second tab 12b2 of the negative electrode 11B on the proximal end side.

Next, the method of manufacturing an electrochemical device in an embodiment of the present invention is explained by referring to FIGS. 1 to 5. Under the method of manufacturing an electrochemical device in an embodiment of the present invention, first, as shown in FIG. 3(A), a positive-electrode sheet 11AS is prepared by connecting a plurality of first current collectors 12a, each having a first current collector main unit 12a1 which is a four-sided sheet of width dimension XA and length dimension YA with a first active material layer 13a formed at least on one of the front and back principal sides, and also having a first tab 12a2 projecting on one side of this first current collector main unit 12a1 in the width direction and whose width dimension is smaller than the width dimension of the first current collector main unit 12a1.

Figure 5:
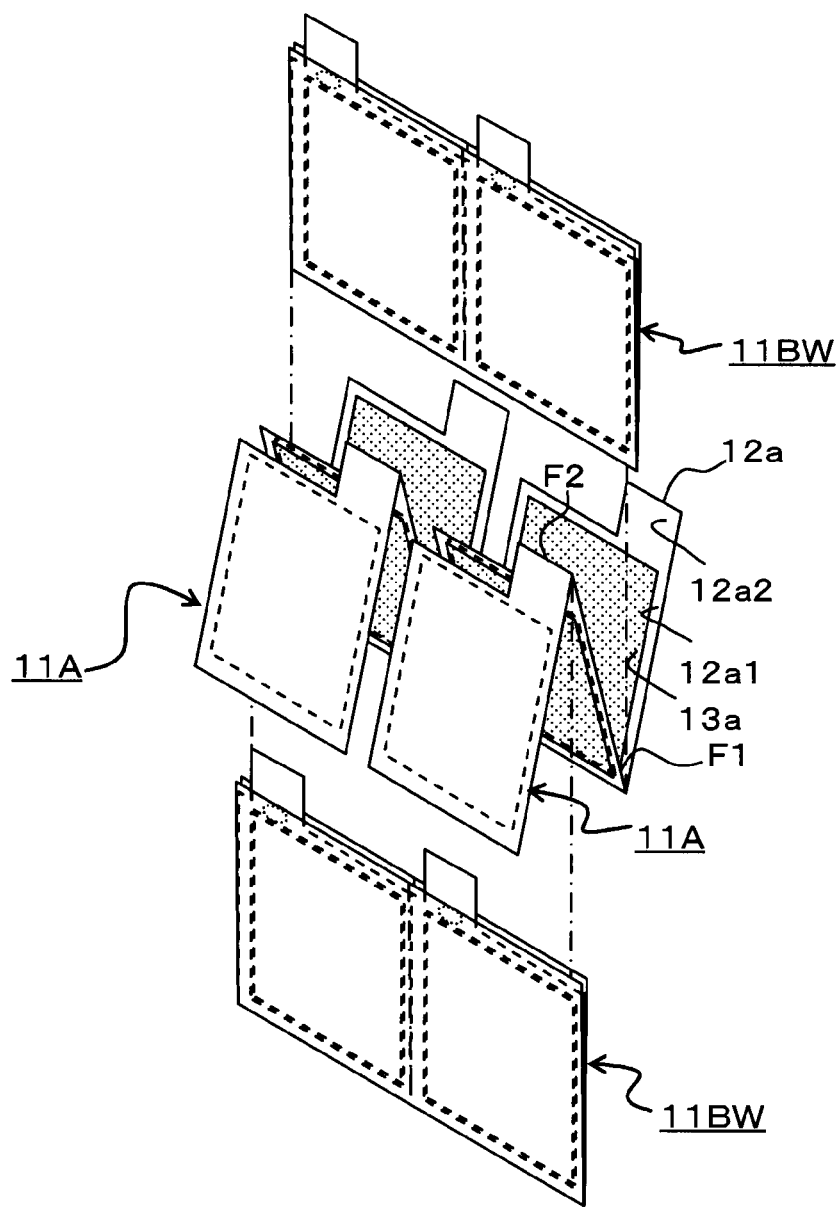
[FIG. 5] is a perspective view showing the step to obtain a laminated sheet body under the method of manufacturing an electrochemical device in an embodiment of the present invention.
Figure 6:
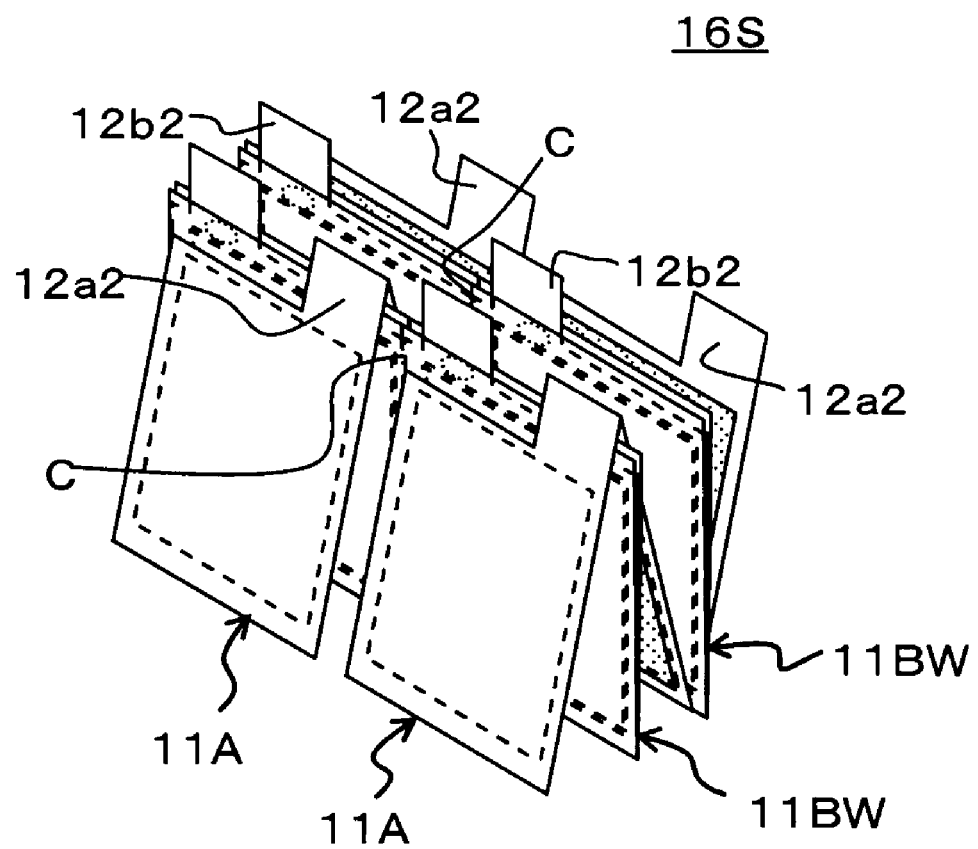
[FIG. 6] is an exploded perspective view showing the laminated sheet body of the electrochemical device in an embodiment of the present invention.
Figure 7:
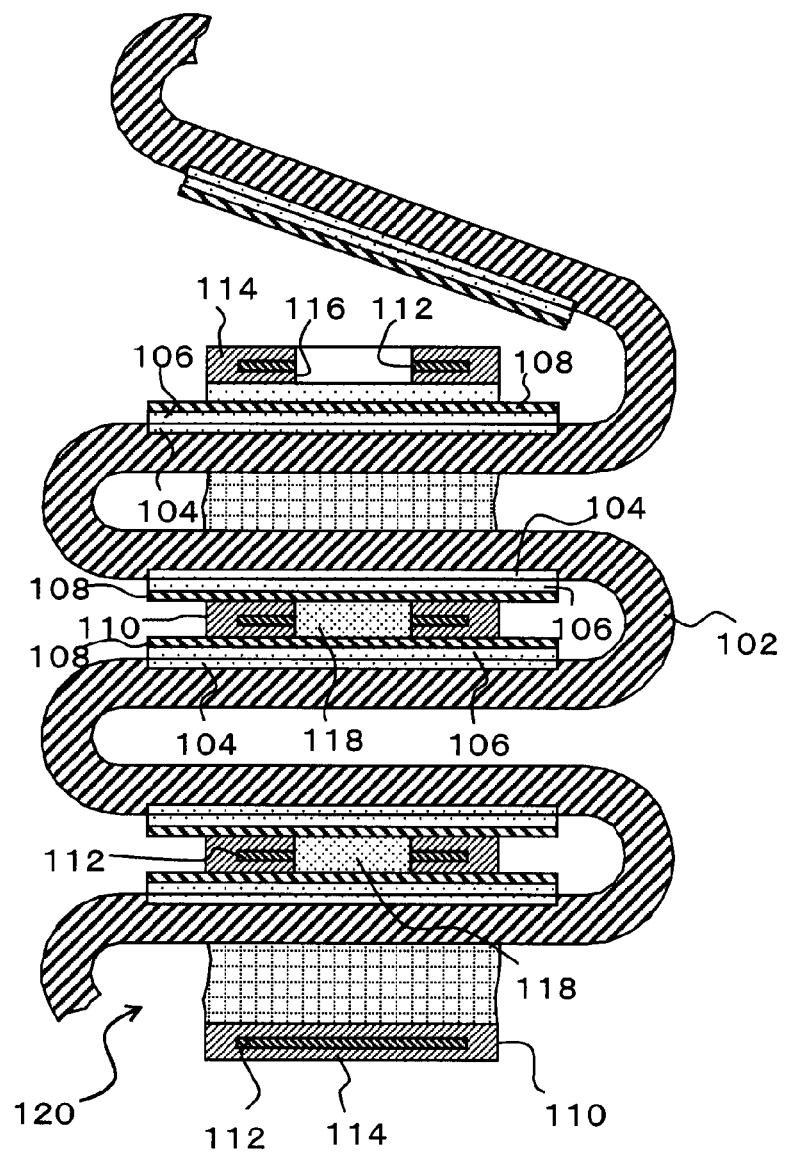
[FIG. 7] is a drawing showing an example of prior art.
Figure 8:
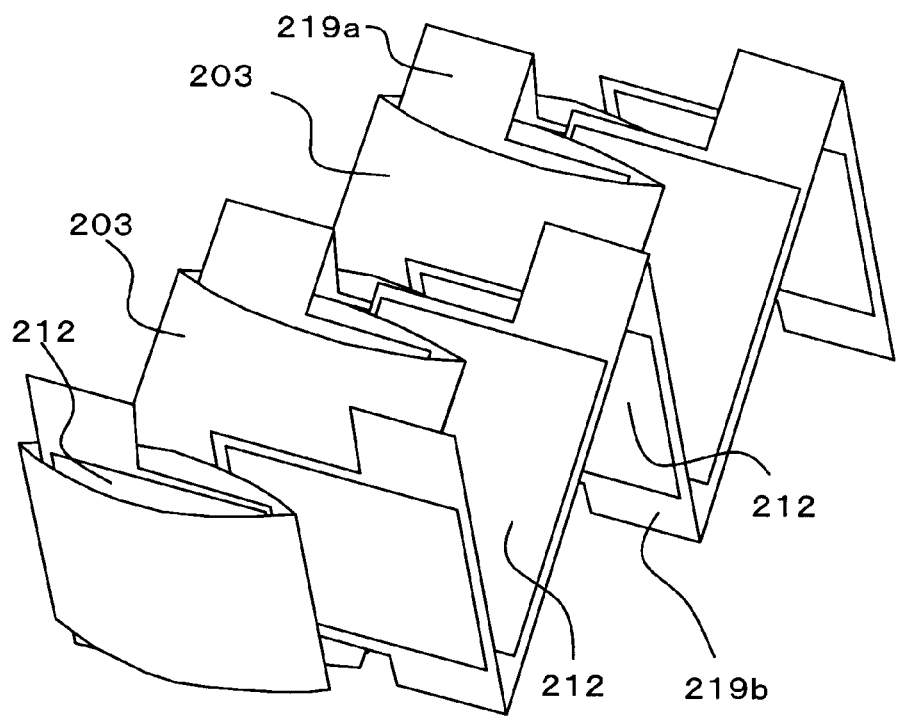
[FIG. 8] is a drawing showing another example of prior art.
Figure 9:
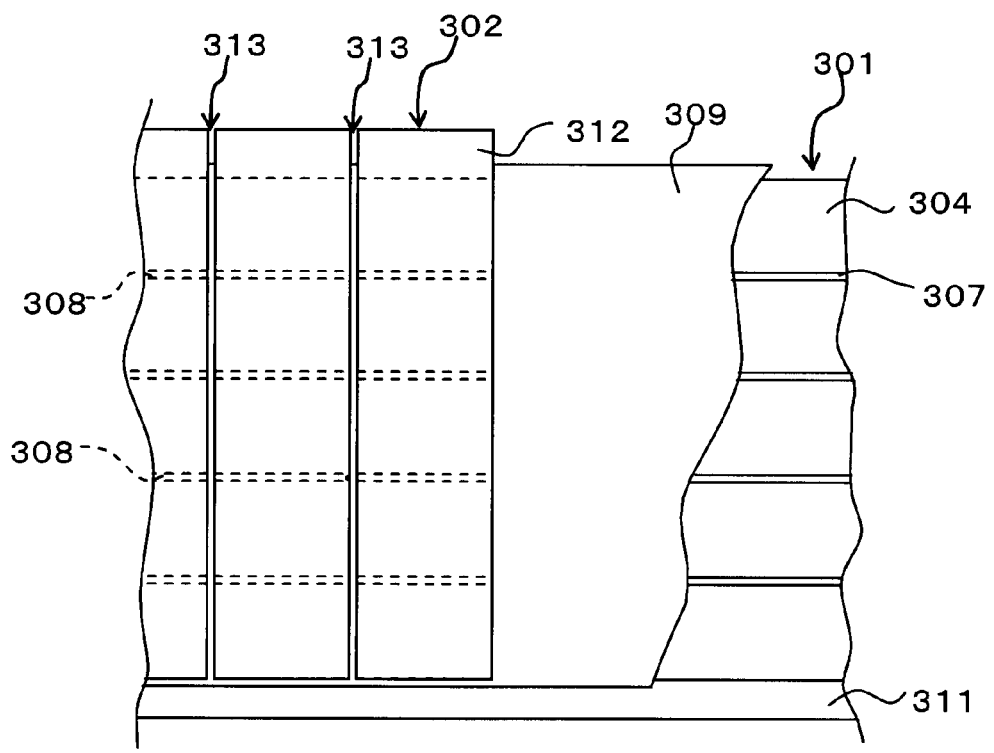
[FIG. 9] is a drawing showing yet another example of prior art.

For example, three first current collectors 12a can be connected in the length direction to constitute this positive-electrode sheet 11AS. In this case, the first current collector main unit 12a1 of the first current collector 12a positioned at the center is connected via side F1 to the first current collector main unit 12a1 of other first current collector 12a positioned in front, while the first tab 12a2 of the first current collector 12a positioned at the center is connected via widthwise side F2 to the first tab 12a2 of other first current collector 12a positioned at rear. Next, as shown in FIG. 3(B), the positive-electrode sheet 11AS is folded by valley-folding the connection part (widthwise side F1) of the first current collector main unit 12a1 of the first current collector 12a positioned at the center and first current collector main unit 12a1 of the first current collector 12a positioned in front, while mountain-folding the connection part (widthwise side F2) of the first tab 12a2 of the first current collector 12a positioned at the center and first tab 12a2 of the current collector 12a positioned at rear, to obtain a positive electrode 11A. Also, a negative-electrode sheet 11BS is prepared where second current collectors 12b, each having a second current collector main unit 12b1 and second tab 12b2, are connected in the width direction. As shown in FIG. 4(A), the second current collector main unit 12b1 is formed into a four-sided sheet of width dimension XB which is greater than width dimension XA of the first current collector main unit 12a1, and length dimension YB, with a second active material layer 13b formed on both front and back principal sides. The second tab 12b2 is projecting to one side of this second current collector main unit 12a1 in the width direction and whose width dimension is smaller than width dimension XB of the second current collector main unit 12a1. Also, a separator sheet 15S is prepared by connecting a plurality of separators 15 in the width direction, each having width dimension XC which is the same as width dimension XB of the second current collector main unit 12b1 and length direction YC twice as long as length dimension YB of the second current collector main unit 12b1. The separator sheet 15S is folded into two in the length direction with the negative-electrode sheet 11BS sandwiched in between, to obtain a negative-electrode continuous body 11BW shown in FIG. 4(B). Multiple units of this negative-electrode continuous body 11BW are prepared. Next, the negative-electrode continuous bodies 11BW are connected to the plurality of positive electrodes 11A that have been arranged in the width direction apart from each other, as shown in FIG. 5, to obtain a laminated sheet body 16S shown in FIG. 6. For example, one negative-electrode continuous body 11BW is inserted between the first current collector 12a positioned at the center and first current collector 12a positioned in front, while other negative-electrode continuous body 11BW is inserted between the first current collector 12a positioned at the center and first current collector 12a positioned at the rear. After they have been inserted, the first tabs 12a2 of positive electrodes 11A are electrically connected together, while the second tabs 12b2 of negative electrodes 11B are electrically connected together. Next, the negative-electrode continuous body 11BW of the laminated sheet body 16S is cut along a predetermined cutting line C to the unit width dimension of an element, to obtain a plurality of laminated bodies 16. Finally, these laminated bodies 16 are sealed in a package 18 together with electrolyte solution E to obtain the electrochemical device 10 shown in FIG. 2.

Also under the aforementioned manufacturing method, the separator sheet 15S and negative-electrode sheet 11BS may be mutually adhered to each other with adhesive A in the step to obtain a negative-electrode continuous body 11BS, as shown in FIG. 4(B).

Also under the aforementioned manufacturing method, conductive connection of the first tab 12a2 and lead conductor 17a can be made at the same time as conductive connection of the first tabs 11a2. Similarly, conductive connection of the second tab 12b2 and lead conductor 17b can be made at the same time as conductive connection of the second tabs 11b2.

The first current collector 12a may be formed using a foil made of aluminum, copper, nickel, stainless steel or other metal, for example. If the electrochemical device 10 in an embodiment is to be used as a lithium-ion capacitor, a foil made of aluminum, stainless steel or other metal may be used. The thickness of the aforementioned foil may be in a range of 10 μm to 50 μm. The first current collector main unit 12a1 may be formed to a four-sided sheet. The term "four-sided" or "rectangular" does not only mean a quadrangle in its strict geometrical definition. For example, the first current collector main unit 12a1 may have a radius or chamfered surface formed at its corner to improve workability or for other reasons. Also, each side can have a concave or projected part. The first tab 12a2 projects on one side of the first current collector main unit 12a1 in the width direction.

The second current collector 12b may be formed using a foil made of aluminum, copper, nickel, stainless steel or other metal, for example. The material for the first current collector 12a may be the same as or different from the material for the second current collector 12b. If the electrochemical device 10 is to be used as a lithium-ion capacitor, a foil made of copper, nickel, stainless steel or other metal may be used. The thickness of the aforementioned foil may be in a range of 10 μm to 50 μm. The second current collector main unit 12b 1 may be formed to a four-sided sheet. Here, "four-sided sheet" does not only mean a quadrangle in its strict geometrical definition. For example, the second current collector main unit 12b1 may have a radius or chamfered surface formed at its corner to improve workability or for other reasons, and each side can have one or more concave or projected parts. The second tab 12b2 projects on one side of the second current collector main unit 12b1 in the width direction.

The first active material layer 13a and second active material layer 13b may contain an active material made of active carbon, polyacene, graphite or other carbon material, or oxide of lithium transition metal, or other material. If the electrochemical device 10 in an embodiment is to be used as a lithium-ion capacitor, any substance that can occlude the lithium ion and/or anion in a reversible manner can be used as the active material, where examples include active carbon, conductive polymer and heat-treated aromatic condensation polymer having a polyacene structure such as polyacene organic semiconductor (PAS), among others. Also, any lithium-containing metal oxide expressed by the general formula of $Li_xM_yO_z$ (M indicates one or multiple metals) such as $LiCoO_2$, $Li_xNiO_2$, $Li_xMnO_2$, $Li_xFeO_2$, or cobalt, manganese, nickel or other transition metal oxide may be used. The material for the first active material layer 13a may be the same as or different from the material for the second active material layer 13b. If the electrochemical device 10 in an embodiment is to be used as a lithium-ion capacitor, the active material is not specifically limited as long as it can occlude the lithium ion in a reversible manner, where examples include graphite, non-graphitizable carbon, active carbon, and heat-treated aromatic condensation polymer having a polyacene structure such as polyacene organic semiconductor (PAS), among others. The aforementioned active material layer can be formed by dispersing in a water-based or organic solvent the aforementioned active material in powder, binder or, if necessary, conductive powder form to produce a slurry and then applying this slurry onto the current collector and drying the current collector. It is also possible to form the slurry to a sheet shape and then attach this sheet onto the current collector. For the binder, styrene butadiene rubber (SBR) or other rubber binder, or polypropylene, polyethylene or other thermoplastic resin, may be used, for example. If the electrochemical device 10 in an embodiment is to be used as a lithium-ion capacitor, SBR or other rubber binder, or polytetrafluoroethylene or polyfluorovinylidene or other fluororesin, or polypropyrene, polyethylene or other thermoplastic resin, etc., may be used for the binder. Also for the aforementioned conductive powder, acetylene black, graphite, metal powder, etc., may be used. As for the method to form each of the above active material layers 13a, 13b onto the surface of each of the above current collector main units 12a1, 12b1, the application method or sheet attachment method may be used, for example.

The positive-electrode sheet 11AS can be structured by three or more first current collectors 12a that are connected together in the length direction. The greater the number of current collectors connected, the higher the average capacity per current collector becomes. Also, not only an odd number, but also an even number, of current collectors can be connected. Also, the positive-electrode 11A can be structured in such a way that the first active material layer 13a is formed on each of the current collector main units 12a1 of the plurality of first current collectors 12a, except for the first current collector 12a at the outermost position. The first active material layer 13a may also be formed on the outermost surface among the current collector main units 12a1 of the plurality of first current collectors 12a to improve workability or for other reason. Additionally if the laminated body 16 is to be split into multiple sets, etc., formation of active material layer on the outermost surface of each set may be omitted. To improve workability or for other reason, one continuous slit or multiple intermittent slits may be formed, or a groove may be formed, in the width direction partly at the location where the current collector main units 12a1 of the folded first current collector 12a of the positive electrode 11A are connected together. Similarly, a slit or groove may be formed at the location where the first tabs 12a2 of the folded first current collector 12a of the positive electrode 11A are connected together.

The negative-electrode sheet 11BS can be structured by two or more second current collectors 12b that are connected together in the width direction. The greater the number of current collectors connected, the more laminated bodies 16 are obtained per assembly process, meaning that the electrochemical device 10 in an embodiment can be produced efficiently. Also, for the negative electrode 11B, an active material layer 13b can be formed on each of the two principal sides, or front and back sides, of the current collector main unit 12b1 of the second current collector 12b. If an additional negative electrode is positioned on the outermost surface of the positive electrode 11A, on this negative electrode an active material layer may be provided only on the surface that faces the positive electrode.

The separator 15 may be formed using a porous material constituted by polyethylene, polytetrafluoroethylene (PTFE), cellulose, aramid resin or other similar material or any mixture thereof. If the electrochemical device 10 in an embodiment is to be used as a lithium-ion capacitor, the separator 15 may be formed using a porous material constituted by cellulose, polyethylene, polypropyrene or other material. The thickness of the separator 15 may be in a range of 20 µm to 50 µm, for example. The separator sheet 15S can also be formed by connecting two or more separators 15 in the width direction.

The negative-electrode continuous body 11BW can be formed by folding the separator sheet 15S into two in the length direction with the negative-electrode sheet 11BS sandwiched in between. Note that the negative-electrode sheet 11BS and separator sheet 15S are mutually adhered to each other by means of, for example, bonding with adhesive A or thermal fusion.

In an example, the insulation layer 14a is formed in a manner covering a surface of the first tab 12a2 of the positive electrode 11A on the proximal end side. Also, in an example, the insulation layer 14b is formed in a manner covering a surface of the second tab 12b2 of the negative electrode 11B on the proximal end side.

The laminated body 16 can be structured to have: a positive electrode 11A; one negative electrode 11B inserted between the first current collector 12a positioned at the center and the first current collector 12a positioned in front and connected via the side F1 to the first current collector 12a positioned at the center; another negative electrode 11B inserted between the first current collector 12a positioned at the center and the first current collector 12a positioned at the rear and connected via the side F2 to the first current collector 12a positioned at the center; and a separator 15 folded into two and positioned between the positive electrode 11A and negative electrode 11B. A negative electrode 11B may also be positioned, via a separator 15, on the outermost side of the plurality of folded first current collectors 12a of the positive electrode 11A.

The lead conductor 17a may be formed using a foil made of aluminum, copper, nickel, stainless steel or other metal, for example. The thickness of the foil may be in a range of 20 µm to 200 µm, for example. In an example, the mutually overlapping and conductively connected first tabs 12a2 of the positive electrode 11A as well as mutually overlapping and conductively connected second tabs 12b2 of the negative electrode 11B are connected to the lead conductors 17a, 17b, respectively. The aforementioned tabs 12a2, 12b2 and aforementioned lead conductors 17a, 17b can be electrically connected by the supersonic welding method, resistance welding method, laser welding method, etc.

The package 18 may be formed by a synthetic resin film with a metal foil laminated on it, for example. The metal foil may be formed by aluminum, etc. The synthetic resin film may be formed, for example, using polypropyrene, nylon, polyethylene terephthalate (PET), polyethylene, ethylene-vinyl acetate copolymer resin, or any laminate thereof (such as a laminate constituted by a nylon base and a polypropylene sealant laminated on top), where the aforementioned material is folded into two and the overlapping sides are fused by means of heat seal.

The electrolyte used for electrolyte solution E may be constituted by tetraethyl ammonium tetrafluoroborate (Et4NBF4) or any chemical compound expressed by the formula (1) below. [R1R2R3R4N]+X- ... (1) (In the formula, R1 to R4 each indicate an alkyl group with 1 to 6 carbon atoms that may have an unsaturated bond, ether bond, amide bond or ester bond, or cycloalkyl group with 4 to 6 carbon atoms that may have a nitrogen atom in the molecule, while X- indicates ClO4-, BF4-, PF6-, (CF3SO2)2N-, CF3SO4-, C2F5SO4- or other negative ion.) The aforementioned electrolyte is dissolved into propylene carbonate (PC), acetonitrile, methoxy acetonitrile, 3-methoxy propionitrile, γ-butyrolactone, butylene carbonate, dimethyl carbonate, ethyl methyl carbonate, ethylene carbonate, sulfolane, 3-methyl sulfolane or other solvent to form electrolyte solution E. If the electrochemical device 10 in an embodiment is to be used as a lithium-ion capacitor, electrolyte made of LiClO4, LiAsF6, LiBF4, LiPF6, Li(C2F5SO2)2N or other lithium salt may be dissolved into ethylene carbonate, propylene carbonate, dimethyl carbonate, diethyl carbonate, γ-butyrolactone, acetonitrile, dimethoxy ethane, tetrahydrofuran, dioxolane, chlorinated methylene, sulforane or other solvent, or a mixture solution combining any two or more of the foregoing solvents, to obtain electrolyte solution E to be used, for example.

Next, an electrical double-layer capacitor made by applying the electrochemical device 10 in an embodiment of the present invention is explained by referring to FIGS. 1 to 5 as deemed appropriate, where the same reference numerals are used to refer to those elements of the electrical double-layer capacitor that have corresponding elements in the aforementioned electrochemical device 10. First, an active material paste containing active carbon, carboxy methyl cellulose, styrene butadiene rubber and acethylene black is applied, by the screen print method, to the opposing positions on the front and back principal sides of an aluminum foil of 25 μm in thickness, after which the aluminum foil is dried for 1 minute at 100° C. to form an active material layer 13a of 10 μm in thickness. Next, first current collectors 12a, each having a first current collector main unit 12a1 which is a four-sided sheet whose width dimension XA is 14 mm and length dimension YA is 17 mm, and also having a first tab 12a2 projecting on one side of the first current collector main unit 12a1 in the width direction and whose width dimension is 5 mm which is smaller than the width dimension of the first current collector main unit and whose length dimension is 4 mm, are punched out using a die from the aluminum foil on which the active material layer 13a has been formed, in the condition where three first current collectors are connected together in the length direction as shown in FIG. 3(A), to obtain two positive-electrode sheets AS.

Next, each of these positive-electrode sheets AS is valley-folded at the part where the current collector main units 12a1 are connected together, while mountain-folded at the part where the first tabs 12a2 are connected together, as shown in FIGS. 3(A) and 3(B), to obtain a positive electrode 11A.

On the other hand, an active material layer 13b is formed on an aluminum foil in the same manner used when the aforementioned active material layer 13a was formed. Next, second current collectors 12b, each having a second current collector main unit 12b1 which is a four-sided sheet whose width dimension XB is 16 mm and length dimension YB is 17 mm, and also having a second tab 12b2 projecting on one side of the second current collector main unit 12b1 in the width direction and whose width dimension is 5 mm which is smaller than the width dimension of the second current collector main unit and whose length dimension is 4 mm, are punched out using a die from the aluminum foil, so that two second current collectors are connected together in the width direction as shown in FIG. 4(A), to obtain two negative-electrode sheets 11BS.

In the meantime, separator sheets 15S, each having a separator 15 whose width dimension XC is 16 mm and length dimension YC is 36 mm, are punched out using a die from a cellulose of 30 μm in thickness in the condition where two sheets are connected together in the width direction, to obtain two separator sheets 15S.

Next, each of these separator sheets 15S is folded into two in the length direction and a negative-electrode sheet 11BS is sandwiched between the two folded sides of the separator sheet 15S, to obtain two sets of negative-electrode continuous bodies 11BW.

Next, one negative-electrode continuous body 11BW is inserted between the first current collector 12a positioned at the center of the positive electrode 11A obtained above and the first current collector 12a positioned in front and connected to the first current collector 12a positioned at the center via the side F1 of the first current collector 12a, while another negative-electrode continuous body 11BW is inserted between the first current collector 12a positioned at the center and the first current collector 12a positioned at the rear and connected to the first current collector 12a positioned at the center via the side F2 of the first tab 12a2, to obtain a laminated sheet body 16S.

Next, the first tabs 12a2 of the positive electrodes of the laminate sheet body obtained above are overlapped with each other, and then one end of a lead conductor 17a constituted by an aluminum strip of 3 mm in width, 40 mm in length and 100 μm in thickness is placed on top and welded together by means of supersonic welding, to conductively connect the first tabs 12a2 of the positive electrodes 11A and lead conductor 17a together.

Similarly, the second tabs 12b2 of the negative electrodes of the laminate sheet body 16S obtained above are overlapped with each other, and then one end of a lead conductor 17b is placed on top and welded together by means of supersonic welding, to conductively connect the second tabs 12b2 of the negative electrodes 11B and lead conductor 17b together.

The negative-electrode continuous body 11BW of the laminated sheet body 16S thus obtained is cut into two to the unit width dimension of an element, to obtain two laminated bodies 16 each constituting an element.

Next, an aluminum laminate film of 38 mm in width and 26 mm in length is folded into two in the width direction and the laminated body 16 that has been cut to the unit of an element is sandwiched in between in such a way that the aforementioned lead conductors 17a, 17b are exposed, and then two of the three overlapping sides are fused by means of heat seal under the conditions of 220° C. for 1 second at 0.5 MPa.

Next, 0.07 g of electrolyte solution constituted by 1.5 mol/l of TEMA-BF4 (triethyl methyl ammonium-tetrafluoroborate)/PC (propylene carbonate) is charged from an opening of the aluminum laminate film that has been folded into two in the previous step, after which the remaining side is fused by means of heat seal under the same conditions as above to seal the package, to obtain an electrical double-layer capacitor.

The electrical double-layer capacitor obtained above was measured for electrical performance (capacitance, internal resistance) based on the constant-current discharge method with AC impedance (1 kHz) using the electrochemical measurement system HZ-5000 and charge/discharge apparatus HJ-2010 manufactured by Hokuto Denko Corporation headquartered in Meguro-ku, Tokyo, Japan. As a result, the capacitance was 0.2F and internal resistance was 200 mΩ.

An example of an electrical double-layer capacitor was explained in the above embodiment, but the present invention is not at all limited to the foregoing and it can be applied, for example, to a so-called lithium-ion capacitor or lithium-ion battery supporting lithium ions at one electrode, or other electrochemical device.

DESCRIPTION OF THE SYMBOLS

10: Electrochemical device, 11A: Positive electrode, 11AS: Positive-electrode sheet, 11B: Negative electrode, 11BS: Negative-electrode sheet, 11BW: Negative-electrode continuous body, 12a: First current collector, 12a1: First current collector main unit, 12a2: First tab, 12b: Second current collector, 12b1: Second current collector main unit, 12b2:

Second tab, 13a, 13b: active material layer, 14a, 14b: Insulation layer, 15: Separator, 15S: Separator sheet, 16: Laminated body, 16S: Laminated sheet body, 17a, 17b: Lead conductor, 18: Package, C: Predetermined cutting line, E: Electrolyte solution, F1: Side (valley-folded), F2: Side (mountain-folded), XA: Width dimension of first current collector main unit, XB: Width dimension of second current collector main unit, XC: Width dimension of separator, YA: Length dimension of first current collector main unit, YB: Length dimension of second current collector main unit, YC: Length dimension of separator

The invention claimed is:

1. An electrochemical device having a separator between positive and negative electrodes, wherein:
the positive electrode has:
a first positive-electrode current collector;
a second positive-electrode current collector; and
a third positive-electrode current collector;
each including a positive-electrode current collector main unit of rectangular sheet shape having an active material layer formed at least on one side, as well as a positive-electrode tab formed partly on a top side of the applicable positive-electrode current collector main unit;
wherein the second positive-electrode current collector is electrically connected to the first positive-electrode current collector via each positive-electrode tab, and the positive-electrode current collector main unit of the second positive-electrode current collector is positioned in a manner facing the back side of the positive-electrode current collector main unit of the first positive-electrode current collector;
wherein the third positive-electrode current collector is electrically connected to the first positive-electrode current collector via a bottom side thereof opposite to the top side of each positive-electrode current collector main unit along which the positive-electrode tab is formed, said bottom side having a connection part having a width which is the same as a width of each positive-electrode current collector main unit, and the positive-electrode current collector main unit of the third positive-electrode current collector is positioned in a manner facing the front side of the positive-electrode current collector main unit of the first positive-electrode current collector;
the negative electrode has:
a first negative-electrode current collector; and
a second negative-electrode current collector;
each including a negative-electrode current collector main unit of rectangular sheet shape having an active material layer formed on both sides, as well as a negative-electrode tab formed partly on a top side of the applicable negative-electrode current collector main unit;
wherein the first negative-electrode current collector is positioned between the first positive-electrode current collector and second positive-electrode current collector;
wherein the second negative-electrode current collector is positioned between the first positive-electrode current collector and third positive-electrode current collector and electrically connected to the first negative-electrode current collector solely via each negative-electrode tab; and
the separator is constituted by:
a first separator having a first sheet area covering the front side of the negative-electrode current collector main unit of the first negative-electrode current collector, a second sheet area covering the back side, and a connection part connecting the first sheet area and second sheet area; and
a second separator having a first sheet area covering the front side of the negative-electrode current collector main unit of the second negative-electrode current collector, a second sheet area covering the back side, and a connection part connecting the first sheet area and second sheet area.

2. An electrochemical device according to claim 1, wherein the negative-electrode current collector main unit is formed over an area wider than the entire surface of the positive-electrode current collector main unit.

3. An electrochemical device according to claim 1, wherein the positive electrode consists of the first positive-electrode current collector; the second positive-electrode current collector, and the third positive-electrode current collector, the negative electrode consists of the first negative-electrode current collector and the second negative-electrode current collector, and the separator consists of the first separator and the second separator.

4. An electrochemical device according to claim 1, wherein the connection part of the first separator covers the bottom side of the first negative-electrode current collector, and the connection part of the second separator covers the bottom side of the second negative-electrode current collector.

5. An electrochemical device according to claim 1, wherein a surface near the tab of the first positive-electrode current collector facing the top side of the first and second negative-electrode current collectors is covered by an insulation layer, and a surface near the tab of the second negative-electrode current collector facing the top side of the first positive-electrode current collectors is covered by an insulation layer.

* * * * *